No. 840,897. PATENTED JAN. 8, 1907.
T. M. BAILEY.
CORN PLANTER.
APPLICATION FILED AUG. 21, 1906.
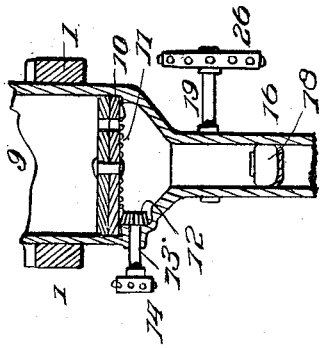
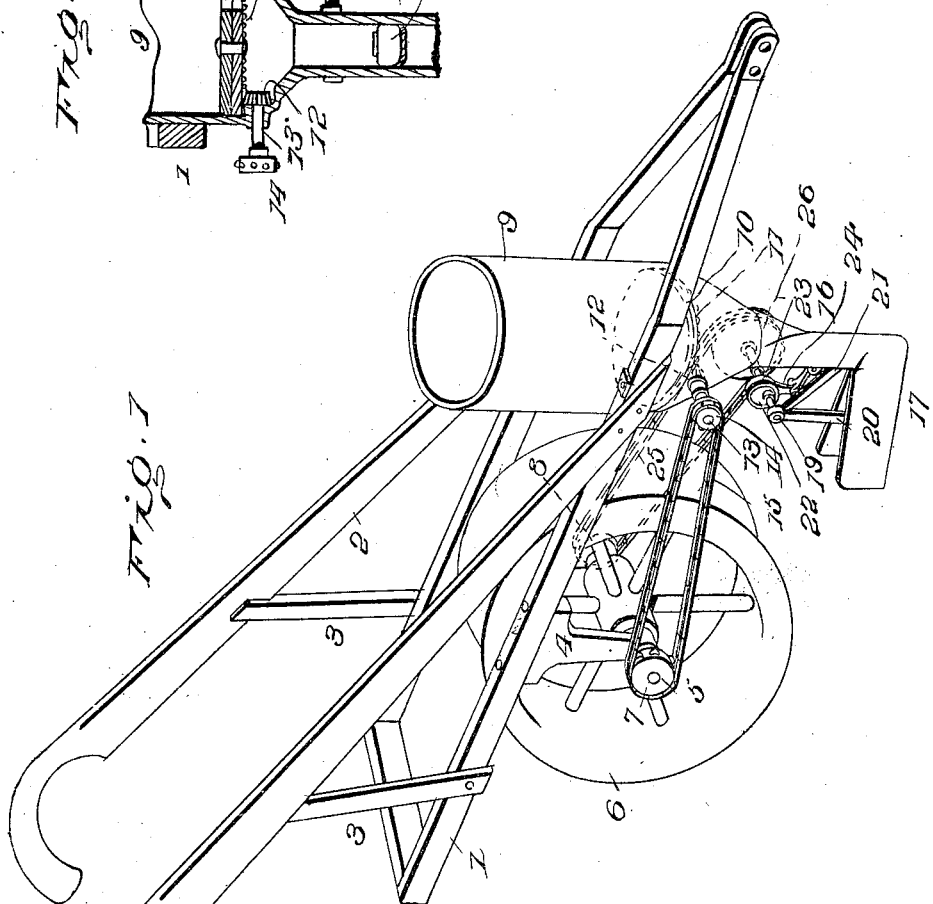
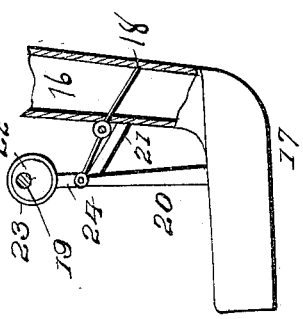
Witnesses
Inventor
T. M. Bailey
By R. A. Lacey,
Attorneys

UNITED STATES PATENT OFFICE.

THOMAS M. BAILEY, OF MADISON, ALABAMA.

CORN-PLANTER.

No. 840,897.     Specification of Letters Patent.     Patented Jan. 8, 1907.

Application filed August 21, 1906. Serial No. 331,500.

*To all whom it may concern:*

Be it known that I, THOMAS M. BAILEY, a citizen of the United States, residing at Madison, in the county of Madison and State of Alabama, have invented certain new and useful Improvements in Corn-Planters, of which the following is a specification.

This invention relates to the class of agricultural machines designed for dropping seed, and designated more particularly as "walking-planters," the purpose being to improve the general structure and to devise novel actuating means for the seed-dropping mechanism, whereby the grain may be deposited in hills in check rows the required distance apart.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a perspective view of a walking-planter embodying the invention. Fig. 2 is a detail view showing more clearly the actuating means for the seed-dropping mechanism. Fig. 3 is a transverse section of the lower portion of the hopper and the grain-spout, showing the relation of the shafts for operating the seed-dropping plate and the gate or valve.

Corresponding and like parts are referred to in the following description and indicated in all the views of the drawings by the same reference characters.

The framework comprises longitudinal bars 1, which are connected at opposite ends, the front portions converging and adapted to have the draft applied thereto in the accustomed way. Handle-bars 2 are attached at their lower ends to the longitudinal bars 1 and are supported near their upper ends by means of braces 3, which firmly attach at their lower ends to the longitudinal bars near their rear ends. Hangers 4 are secured to the longitudinal bars and support an axle 5, to which is secured a ground-wheel 6, whose tread is made concave, so as to press the soil upon the seed after the same have been deposited. Sprocket-wheels 7 and 8 are also secured to opposite ends of the axle 5, and power is taken therefrom for operating parts of the seed-dropping mechanism. A hopper 9 is mounted upon the front portion of the frame and its lower portion tapers and is provided with seed-dropping mechanism consisting of companion plates, the lower plate 10 being rotatable and provided with circular cog-gearing 11, with which a pinion 12 meshes, said pinion being fixed to a transverse shaft 13, having a sprocket-wheel 14, which is connected by sprocket-chain 15 with the sprocket-wheel 7.

The grain is directed into the trench or furrow from the hopper by means of a spout 16, which connects at its upper end with the discharge of the hopper and has its lower portion 17 rearwardly curved so as to run in the furrow or trench. In horizontal section the grain-spout 16 has its opposite sides rearwardly diverged and forming a front edge, which acts as an opener to spread the soil and forming the furrow or trench into which the corn or other grain is deposited. A gate or valve 18 is arranged within the grain-spout, preferably near its delivery end, and is intended to arrest the discharge of the grain until the proper moment when said gate is opened, thereby permitting the corn to be dropped so as to form hills, which aline transversely of the field, so as to form check rows. Suitable means are provided for actuating the gate or valve, and, as illustrated, a shaft 19 is mounted in bearings formed at the intersection of braces 20 and 21, extended from, respectively, horizontal and vertical portions of the grain-spout, said shaft being provided with an eccentric 22, which by means of an eccentric-strap 23 and rod 24 effects an opening and closing of the gate or valve 18 as said shaft 19 is rotated. Motion is imparted to the shaft 19 by means of a sprocket-chain 25, which connects the sprocket-wheel 8 with a sprocket-wheel 26, fast to an end portion of the shaft 19. As the machine is impelled over the ground by means of draft applied thereto in the accustomed manner or in any suitable way the operator walking in the rear directs the machine by proper manipulation of the handle-bars 2. In the forward movement of the machine the grain-spout 16 forms a trench or furrow into which the grain is dropped in hills. The grain-wheel 6 tracks with the horizontal portion 17 of the grain-spout and acts both as a driver and a coverer, rotary motion being imparted to the shafts 13 and 19 in the manner stated. As the seed-dropping plate 11 rotates the grain is permitted to discharge from the hopper into the grain-spout and is arrested by the gate or valve 18, and at the proper distance said gate or valve is moved to release the grain, which passes quickly into the furrow or trench and a moment later is covered by the earth, which is pressed thereon by means of the wheel 6.

Having thus described the invention, what is claimed as new is—

1. In a planter, the combination of a grain-spout comprising vertical and horizontal portions, braces extended from, respectively, said vertical and horizontal portions and provided at their points of intersection with bearings, a transverse shaft mounted in said bearings, a gate located in said spout to retard the delivery of grain therethrough, and an eccentric connection between said gate and transverse shaft for actuating the gate at stated intervals.

2. In a planter, the combination of a grain-spout comprising vertical and horizontal portions, means for supplying grain to the spout at stated intervals, a gate located in said spout to retard the delivery of the grain therethrough, a shaft, an eccentric connection with said shaft and gate, a drive-shaft, and independent connections between said drive-shaft and the means for supplying grain to the spout and to the shaft for operating the gate located in said spout.

In testimony whereof I affix my signature in presence of two witnesses.

THOMAS M. BAILEY. [L. S.]

Witnesses:
H. C. BINFORD,
J. R. SCALES.